(12) United States Patent
Almeida et al.

(10) Patent No.: US 11,555,998 B2
(45) Date of Patent: Jan. 17, 2023

(54) CAPACITANCE SENSING IN A MIRROR ASSEMBLY WITH A BIASED SUBSTRATE

(71) Applicant: BEIJING VOYAGER TECHNOLOGY CO., LTD., Beijing (CN)

(72) Inventors: Sergio Almeida, Mountain View, CA (US); Zuow-Zun Chen, Mountain View, CA (US); Youmin Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 400 days.

(21) Appl. No.: 15/931,568

(22) Filed: May 13, 2020

(65) Prior Publication Data
US 2021/0356735 A1 Nov. 18, 2021

(51) Int. Cl.
*G02B 26/08* (2006.01)
*G01S 7/481* (2006.01)

(52) U.S. Cl.
CPC ........ *G02B 26/0841* (2013.01); *G01S 7/4817* (2013.01)

(58) Field of Classification Search
CPC ............ G02B 26/0833; G02B 26/0841; G02B 26/0816; G02B 26/10; G02B 26/105; B81B 3/0086; G01S 7/931; G01S 7/48; G01S 7/481; G01S 7/484; G01S 7/486; G01S 7/4911; G01S 7/4912
See application file for complete search history.

(56) References Cited

U.S. PATENT DOCUMENTS 10,514,446 B1 * 12/2019 Wang .................... G01S 17/931
2008/0093685 A1 * 4/2008 Watanabe ............. B81B 3/0086
257/E29.324

* cited by examiner

*Primary Examiner* — John P. Dulka
(74) *Attorney, Agent, or Firm* — Bayes PLLC

(57) ABSTRACT

Embodiments of the disclosure provide a mirror assembly for controlling optical directions in an optical sensing system. The mirror assembly may include a substrate and a micro mirror suspended over the substrate by at least one beam. The at least one beam may be mechanically coupled to the substrate. The mirror assembly may also include an actuator configured to tilt the micro mirror with respect to the substrate. The mirror assembly may further include a position sensor configured to detect a position of the micro mirror. Moreover, the mirror assembly may include a bias voltage source electrically coupled to the substrate to bias the substrate with a bias voltage.

20 Claims, 9 Drawing Sheets

CAPACITANCE SENSING IN A MIRROR ASSEMBLY WITH A BIASED SUBSTRATE

TECHNICAL FIELD

The present disclosure relates to optical sensing systems such as a light detection and ranging (LiDAR) system, and more particularly to, a mirror assembly for controlling optical directions in such an optical sensing system.

BACKGROUND

Optical sensing systems such as LiDAR systems have been widely used in autonomous driving and/or for producing high-definition maps. For example, a typical LiDAR system measures the distance to a target by illuminating the target with pulsed laser light beams and measuring the reflected pulses with a sensor such as a photodetector or a photodetector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

The pulsed laser light beams emitted by a LiDAR system are typically directed to multiple directions to cover a field of view (FOV). Various methods can be used to control the directions of the pulsed laser light beams. Existing LiDAR systems generally use electrostatic-, piezoelectric-, or magnetic-based actuators (e.g., electrostatic actuators, piezoelectric actuators, magnetic actuators, etc.) to drive an optical component, such as a mirror, in the LiDAR systems to direct the pulsed laser light beams to the surrounding environment when the mirror is oscillating back and forth. The oscillation of the mirror can be controlled based on sensing changes in capacitance caused by the movement of the mirror. However, the accuracy of capacitance sensing is hindered by parasitic capacitance.

Embodiments of the disclosure improve the accuracy of capacitance sensing by providing a mirror assembly with a biased substate to reduce the effect of parasitic capacitance.

SUMMARY

Embodiments of the disclosure provide a mirror assembly for controlling optical directions in an optical sensing system. The mirror assembly may include a substrate and a micro mirror suspended over the substrate by at least one beam. The at least one beam may be mechanically coupled to the substrate. The mirror assembly may also include an actuator configured to tilt the micro mirror with respect to the substrate. The mirror assembly may further include a position sensor configured to detect a position of the micro mirror. Moreover, the mirror assembly may include a bias voltage source electrically coupled to the substrate to bias the substrate with a bias voltage.

Embodiments of the disclosure also provide a method for controlling a mirror assembly in an optical sensing system. The method may include receiving, by a micro mirror of the mirror assembly, an optical beam emitted from an optical source. The micro mirror may be suspended over a substrate of the mirror assembly by at least one beam mechanically coupled to the substrate. The method may also include tilting, by an actuator, the micro mirror with respect to the substrate to change a direction of the optical beam. The method may also include detecting, by a position sensor, a position of the micro mirror. The method may further include controlling, by the actuator, the tilting of the micro mirror based on the detected position. In addition, the method may include biasing, by a bias voltage source electrically coupled to the substrate, the substrate with a bias voltage.

Embodiments of the disclosure further provide an optical sensing system. The optical sensing system may include an optical source configured to emit an optical beam to scan an environment around the optical sensing system. The optical sensing system may also include a mirror assembly configured to control a direction of the optical beam. The mirror assembly may include a substrate and a micro mirror suspended over the substrate by at least one beam. The at least one beam may be mechanically coupled to the substrate. The mirror assembly may also include an actuator configured to tilt the micro mirror with respect to the substrate. The mirror assembly may further include a position sensor configured to detect a position of the micro mirror. Moreover, the mirror assembly may include a bias voltage source electrically coupled to the substrate to bias the substrate with a bias voltage.

It is to be understood that both the foregoing general description and the following detailed description are exemplary and explanatory only and are not restrictive of the invention, as claimed.

DETAILED DESCRIPTION

Figure 1:
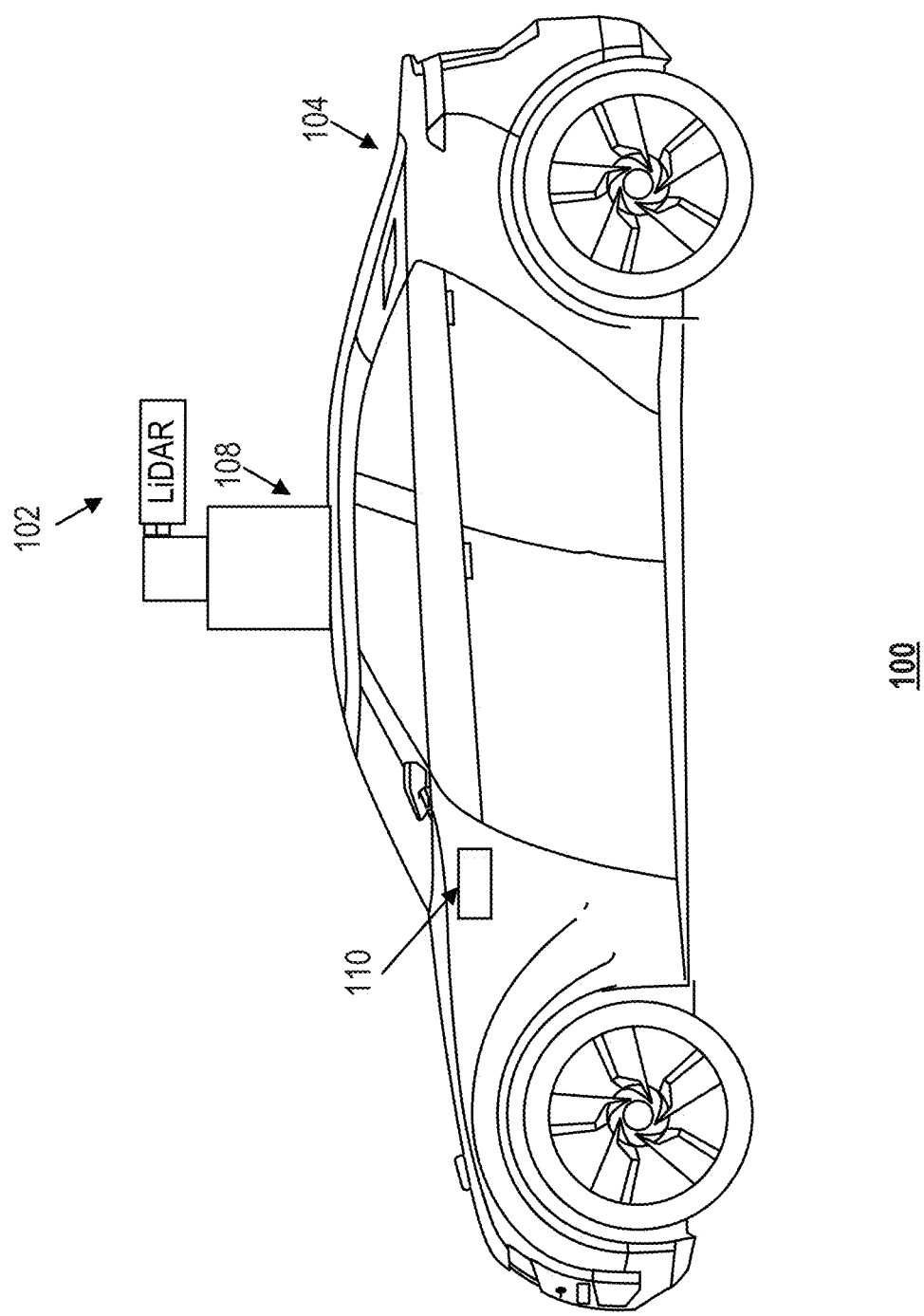
FIG. 1 illustrates a schematic diagram of an exemplary vehicle equipped with a LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for controlling optical directions in an optical sensing system (e.g., a LiDAR system) using a mirror assembly. The mirror assembly may include a mirror configured to direct an optical beam into a plurality of directions to facilitate scanning of an environment around the optical sensing system. For example, the mirror can be driven by at least one actuator to tilt certain angles along an axis, thereby directing (e.g., guiding, reflecting, refracting, inflecting, deflecting, and/or diffracting) incident optical beams from an optical source (e.g., a laser source) toward multiple directions to, for example, scan the environment around the optical sensing system. The mirror can be implemented using a single micro mirror or an array of micro mirrors. In some embodiments, the mirror assembly can be made from semiconductor materials using microelectromechanical system (MEMS) technologies. Such a mirror assembly can also be referred to as a micromachined mirror assembly or a MEMS mirror assembly.

A mirror in a micromachined mirror assembly can be driven by one or more electrostatic actuators. For example, an electrostatic actuator may apply an electrical signal to generate a driving force (e.g., in the form of an electric force) pulling or attracting the mirror, often through a comb structure at an edge of the mirror, toward another comb structure on a stationary structure of the electrostatic actuator. By controlling the timing of the application of the electric force, the mirror can be driven to oscillate (e.g., tilting along an axis back and forth).

The timing of the application of the electric force can be controlled using a feedback-based closed-loop mechanism. For example, a position sensor may be used to detect the current position (e.g., a tilting angle) of the mirror relative to the initial position when the mirror is in a stationary state. Position sensing can be achieved through capacitance sensing because the capacitance between overlapping comb structures indicates the position of the mirror. Therefore, capacitance sensing is important in controlling the motion of the mirror as the result of capacitance sensing is used as feedback to regulate the application of the electric force. However, the accuracy of capacitance sensing is often hindered by parasitic capacitances, such as the parasitic capacitance of the substrate on which the mirror assembly is constructed. In some cases, the parasitic capacitance also varies dynamically with the electrical signal that drives the mirror, making accurate capacitance sensing even more challenging.

Embodiments of the present disclosure improve the accuracy of capacitance sensing by providing a mirror assembly having a biased substrate to reduce the effect of parasitic capacitance. For example, based on the capacitance-voltage (C-V) characteristic of the substrate, a positive or negative bias voltage may be applied to bias the substrate. By controlling the value of the bias voltage, the biased substrate may operate in an accumulation mode or a depletion mode. In either of these modes, the variation of the parasitic capacitance can be clamped into a relatively narrow region. In this way, the effect of the parasitic capacitance can be more accurately accounted for, which in turn improves the accuracy of the capacitance sensing. More accurate capacitance sensing leads to more accurate position sensing, which improves the overall controllability of the mirror assembly. The performance of an optical sensing system equipped with such an improved mirror assembly can be improved through a higher scanning accuracy, precision, range, and/or speed. Such an improved optical sensing system can be used in many applications, including, for example, autonomous driving and high-definition map survey, in which the optical sensing system can be equipped on a vehicle.

FIG. 1 illustrates a schematic diagram of an exemplary vehicle 100 equipped with an optical sensing system (e.g., a LiDAR system) 102 (hereinafter also referred to as LiDAR system 102), according to embodiments of the disclosure. Consistent with some embodiments, vehicle 100 may be a survey vehicle configured for acquiring data for constructing a high-definition map, 3-D buildings, and/or city modeling. Vehicle 100 may also be an autonomous driving vehicle.

As illustrated in FIG. 1, vehicle 100 may be equipped with LiDAR system 102. In some embodiments, LiDAR system 102 may be mounted to a body 104 via a mounting structure 108. Mounting structure 108 may be an electro-mechanical device installed or otherwise attached to body 104 of vehicle 100. Mounting structure 108 may use screws, adhesives, or another mounting mechanism. In some embodiments, LiDAR system 102 may be integrated with vehicle 100 without using mounting structure 108. For example, LiDAR system 102 may be integrated as part of vehicle 100 on the top, side, front, and/or back of vehicle 100. Vehicle 100 may be additionally equipped with a sensor 110 inside or outside body 104 using any suitable mounting mechanisms or integrated as part of vehicle 100. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102, sensor 110, and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 may measure the distance to a target by illuminating the target with optical signals such as pulsed laser beams and measuring the reflected pulses with a receiver. The laser beams used by Li DAR system 102 may be in the ultraviolet, visible, or near infrared frequency range. In some embodiments of the present disclosure, LiDAR system 102 may capture point clouds including depth information of the objects in the surrounding environment. As vehicle 100 moves along the trajectory, LiDAR system 102 may continuously capture data. Each set of scene data captured at a certain time point or range is known as a data frame.

Figure 2:
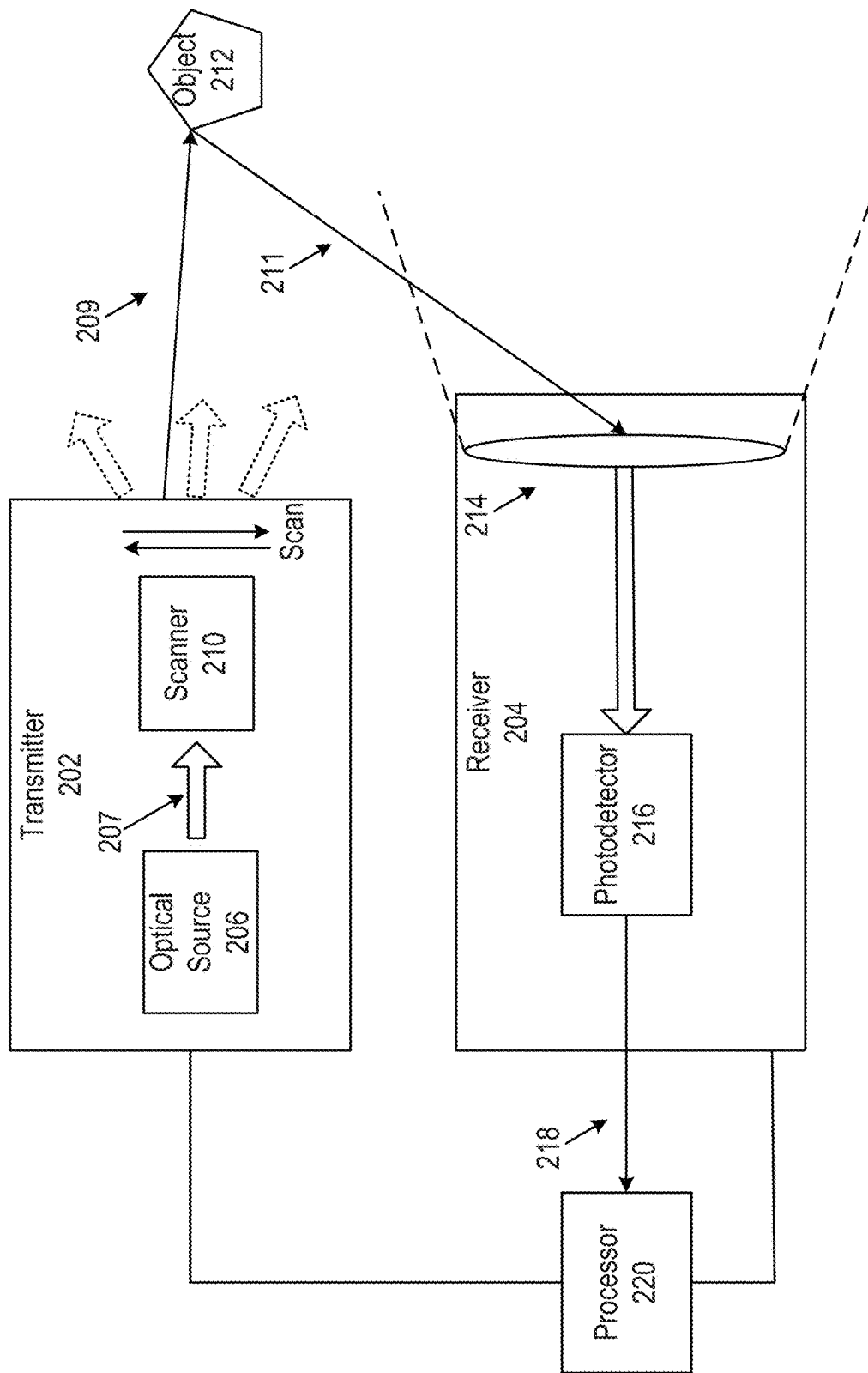
FIG. 2 illustrates a block diagram of an exemplary LiDAR system, according to embodiments of the disclosure.

FIG. 2 illustrates a block diagram of an exemplary implementation of LiDAR system 102, according to embodiments of the disclosure. LiDAR system 102 may include a transmitter 202 and a receiver 204. Transmitter 202 may emit laser beams along multiple directions. Transmitter 202 may include one or more optical sources 206 (e.g., one or more laser sources) and one or more scanners 210. As will be described below in greater detail, scanner 210 may include a micromachined mirror assembly having a mirror driven by one or more actuators.

Transmitter 202 can sequentially emit a stream of pulsed laser beams in different directions within a scan range (e.g., a range in angular degrees), as illustrated in FIG. 2. Optical source 206 may be configured to provide a laser beam 207 (also referred to as a "native laser beam") to scanner 210. In some embodiments of the present disclosure, optical source 206 may generate a pulsed laser beam in the ultraviolet, visible, or near infrared wavelength range.

In some embodiments of the present disclosure, optical source 206 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, or 848 nm. It is understood that any suitable laser source may be used as optical source 206 for emitting laser beam 207.

Scanner 210 may be configured to emit a laser beam 209 to an object 212 in a first direction. Object 212 may be made of a wide range of materials including, for example, non-metallic objects, rocks, rain, chemical compounds, aerosols, clouds and even single molecules. The wavelength of laser beam 209 may vary based on the composition of object 212. In some embodiments, at different time points during the scan, scanner 210 may emit laser beam 209 to object 212 in different directions within a range of scanning angles by tilting the mirror of the micromachined mirror assembly. In some embodiments of the present disclosure, scanner 210 may also include optical components (e.g., lenses, other mirrors) that can focus pulsed laser light into a narrow laser beam to increase the scan resolution and/or the range to scan object 212.

In some embodiments, receiver 204 may be configured to detect a returned laser beam 211 returned from object 212. The returned laser beam 211 may be in a different direction from laser beam 209. Receiver 204 can collect laser beams returned from object 212 and output electrical signals reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include one or more lenses 214 and one or more photodetectors 216. Lens 214 may be configured to collect light from a respective direction in its field of view (FOV). At different time points during the scan, returned laser beam 211 from different directions may be collected by lens 214. Returned laser beam 211 may be returned from object 212 and may have the same wavelength as laser beam 209.

Photodetector 216 may be configured to detect returned laser beam 211 returned from object 212. In some embodiments, photodetector 216 may convert the laser light (e.g., returned laser beam 211) collected by lens 214 into an electrical signal 218 (e.g., a current or a voltage signal). Electrical signal 218 may be generated when photons are absorbed in a photodiode included in photodetector 216. In some embodiments of the present disclosure, photodetector 216 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiPM/MPCC detector array, or the like.

LiDAR system 102 may also include one or more processor 220. Processor 220 may receive electrical signal 218 generated by photodetector 216. Processor 220 may process electrical signal 218 to determine, for example, distance information carried by electrical signal 218. Processor 220 may construct a point cloud based on the processed information. Processor 218 may include a microprocessor, a microcontroller, a central processing unit (CPU), a graphical processing unit (GPU), a digital signal processor (DSP), or other suitable data processing devices. Processor 220 may control the operation of transmitter 202 and/or receiver 204.

For example, processor 220 may control scanner 210 based on feedback signals from capacitance sensing, which will be described in greater detail below.

While scanner 210 is described as part of transmitter 202, it is understood that in some embodiments, receiver 204 may also include a scanner, e.g., before photodetector 216 in the light path. The scanner included in receiver 204 may be the same as or similar to scanner 210, and may operate in synchronization or in tandem with scanner 210. The inclusion of such a scanner in receiver 204 can improve the signal-to-noise ratio (SNR) and sensitivity of receiver 204. For example, photodetector 216 can capture light, e.g., returned laser beam 211 from desired directions, thereby avoiding interferences from other light sources, such as the sun and/or other LiDAR systems.

Figure 3:
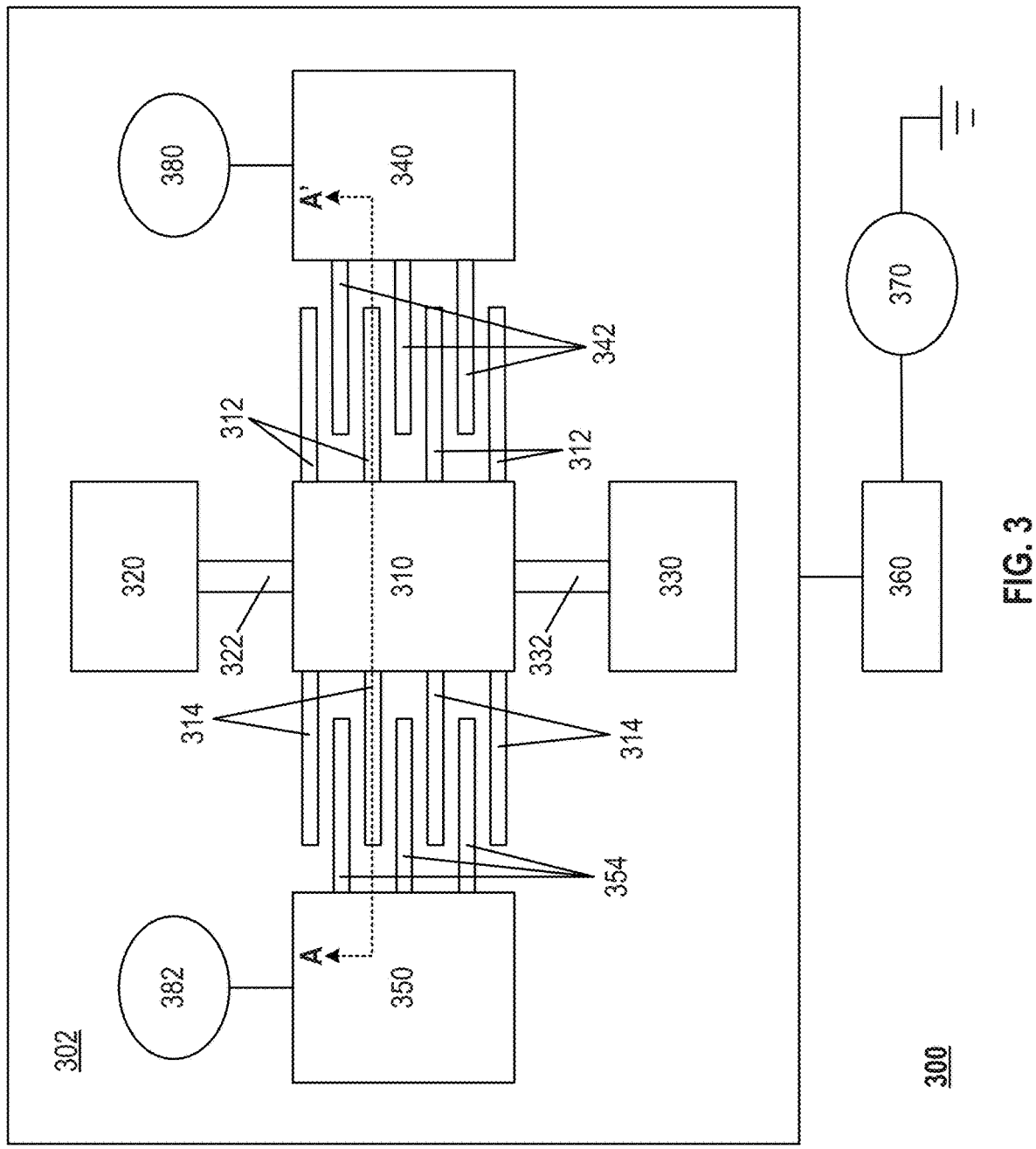
FIG. 3 illustrates a schematic diagram of an exemplary mirror assembly, according to embodiments of the disclosure.
Figure 4:
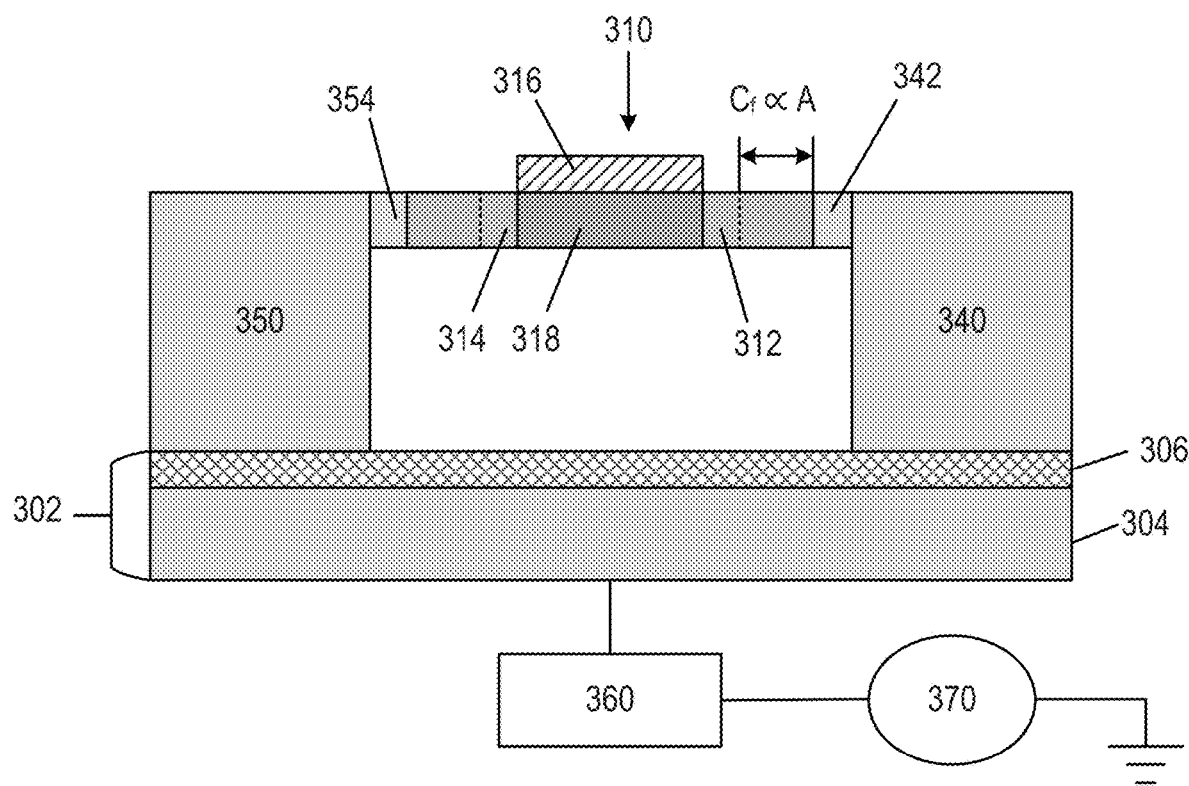
FIG. 4 illustrates a section view of the exemplary mirror assembly shown in FIG. 3, according to embodiments of the disclosure.
Figure 5:
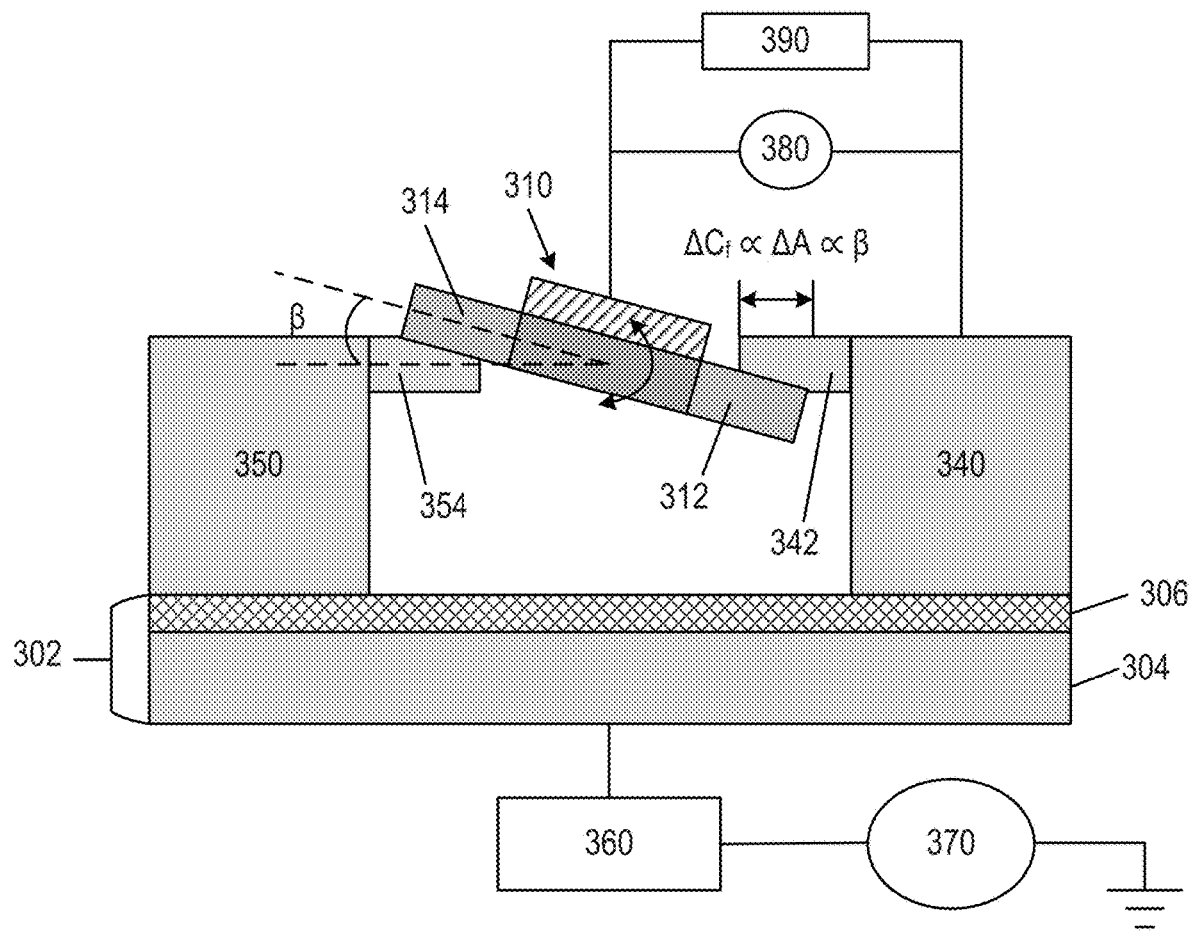
FIG. 5 illustrates another section view of the exemplary mirror assembly shown in FIG. 3, according to embodiments of the disclosure.

FIG. 3 illustrates a schematic diagram of an exemplary mirror assembly 300 (top view), according to embodiments of the disclosure. FIG. 4 illustrates a section view of mirror assembly 300 along line A-A' when mirror assembly 300 is in a static state. FIG. 5 illustrates a section view of mirror assembly 300 along line A-A' when mirror assembly 300 is in a dynamic state. In the following passages, FIGS. 3-5 are discussed together.

As shown in FIG. 3, mirror assembly 300 may include a substrate 302. Substrate 302 may be used as a base on which other components of mirror assembly 300 can be formed. In some embodiments, substrate 302 may include a single layer, such as a silicon (Si) layer. In other embodiments, substrate 302 may include multiple layers. For example, as shown in FIGS. 4 and 5, substrate 302 may include a semiconductor layer 304 and an insulator layer 306. Semiconductor layer 304 may be a silicon (Si) layer, although other semiconductor materials may be used. Insulator layer 306 may be formed on top of semiconductor layer 304. In some embodiments, insulator layer 306 may be a silicon dioxide ($SiO_2$) layer. Multiple other components of mirror assembly 300 may be formed on top of insulator layer 306.

Returning to FIG. 3, mirror assembly 300 may include a mirror 310 suspended over substrate 302 by beams 322 and 332. Mirror 310 may be implemented by a single micro mirror and an array of micro mirrors. For simplicity, mirror 310 is also referred to as micro mirror 310. Beam 322 may be mechanically coupled to substrate 302 through an anchor 320. Similarly, beam 332 may be mechanically coupled to substrate 302 through an anchor 330. FIGS. 4 and 5 schematically show that mirror 310 is suspended over substrate 302. In some embodiments, substrate 302, anchors 320 and 330, beams 322 and 332, and mirror 310 may couple to one another to form a single mechanical structure. Anchors 320 and 330 may be rigidly coupled to substrate 302. As used herein, rigid coupling refers to a fixed mechanical coupling such that relative motion or displacement between the two coupling components is not allowed. Beams 322 and 332 may also be referred to as springs, which may allow limited flexibility such that the suspended mirror 310 may tilt along an axis defined by beams 322 and 332. For example, referring to FIG. 5, mirror 310 may tilt with respect to substrate 302 back and forth in a clockwise and counter-clockwise manner. The tilting motion of mirror 310 may be utilized to change the direction of an incident optical beam into multiple scanning directions.

As shown in FIG. 4, mirror 310 may include a reflective layer 316 and a supporting layer 318. Support layer 318 may be made of the same material as beams 322/332 and anchors 320/330. For example, support layer 318 may be formed together with beams 322/332 and anchors 320/330. Reflective layer 316 may include a high-reflection material to reflect optical signals.

In some embodiments, mirror assembly 300 may include one or more actuators configured to tilt mirror 310 with respect to substrate 302. FIG. 3 shows an electrostatic actuator that includes an anchor 340, a first plurality of comb fingers 342 extending from anchor 340 toward mirror 310, a second plurality of comb fingers 312 extending from mirror 310 toward anchor 340 and interleaving with comb fingers 342, and a driving voltage source 380 configured to apply a driving voltage across comb fingers 342 and comb fingers 312. Anchor 340 may be similar in composition to that of anchors 320 and 330, and may be formed in a similar manner. Anchor 340 may be mechanically coupled to substrate 302. In some embodiments, anchor 340 may be rigidly coupled to substrate 302. Comb fingers 342 may be mechanically or even rigidly coupled to anchor 340 and maintain a static state during operation of mirror assembly 300. Comb fingers 312 may be mechanically or even rigidly coupled to mirror 310 (e.g., at an edge of mirror 310). During operation of mirror assembly 300, comb fingers 312 may be set in motion by the attraction force resulting from the application of the driving voltage to comb finger 342, thereby tilting mirror 310.

In some embodiments, two actuators may be disposed in a symmetrical manner to drive mirror 310 on both sides. As shown in FIG. 3, a second actuator on the left side may include an anchor 350, a first plurality of comb fingers 354, a second plurality of comb fingers 314, and a driving voltage source 382, similar to its counterpart on the right side.

Referring to FIG. 4, when mirror 310 is in a static state, mirror 310 is parallel to substrate 302. In other words, the relative angle between mirror 310 and substrate 302 is zero degree. Turning to FIG. 5, when mirror 310 is in a dynamic state, in which mirror 310 is titling back and forth (clockwise and counterclockwise), the position of mirror 310 can be indicated by the relative angle between mirror 310 and substrate 302, denoted as angle β. Information of the position of mirror 310 (e.g., β) is important to control the tilting of mirror 310 because it is more efficient to apply the attraction force when comb fingers 312 are moving toward comb fingers 342. In this way, the attraction force can accelerate the tilting motion of mirror 310. On the other hand, if the attraction force is applied when comb fingers 312 are moving away from comb fingers 342, the tilting motion would be decelerated.

Mirror assembly 300 may include a position sensor 390 configured to detect a position (e.g., β) of mirror 310. In some embodiments, position sensor 390 may be implemented by a capacitance sensor (also referred to as 390) configured to measure the capacitance or a change in capacitance between mirror 310 and anchor 340. Referring to FIG. 4, the capacitance between comb fingers 312 and 342 (denoted as $C_f$) is proportional to the overlapping areas (denoted as A) between these two sets of interleaving comb fingers. Now referring to FIG. 5, when mirror 310 is in motion, the change in capacitance $C_f$ (denoted as $\Delta C_f$) is proportional to the change in areas A (denoted as $\Delta A$), which is also proportional to angle β. Therefore, angel β can be determined or derived based on $\Delta C_f$. Therefore, it is desirable to accurately measure $C_f$ or $\Delta C_f$ using capacitance sensor 390.

Figure 6:
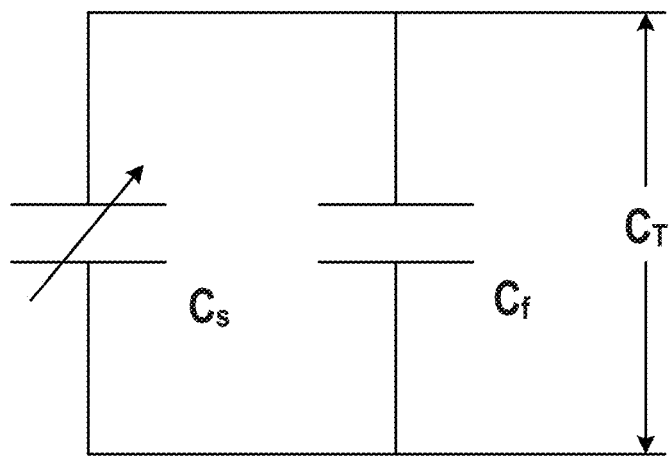
FIG. 6 illustrates an exemplary circuit for modeling capacitance sensing, according to embodiments of the disclosure.
Figure 7:
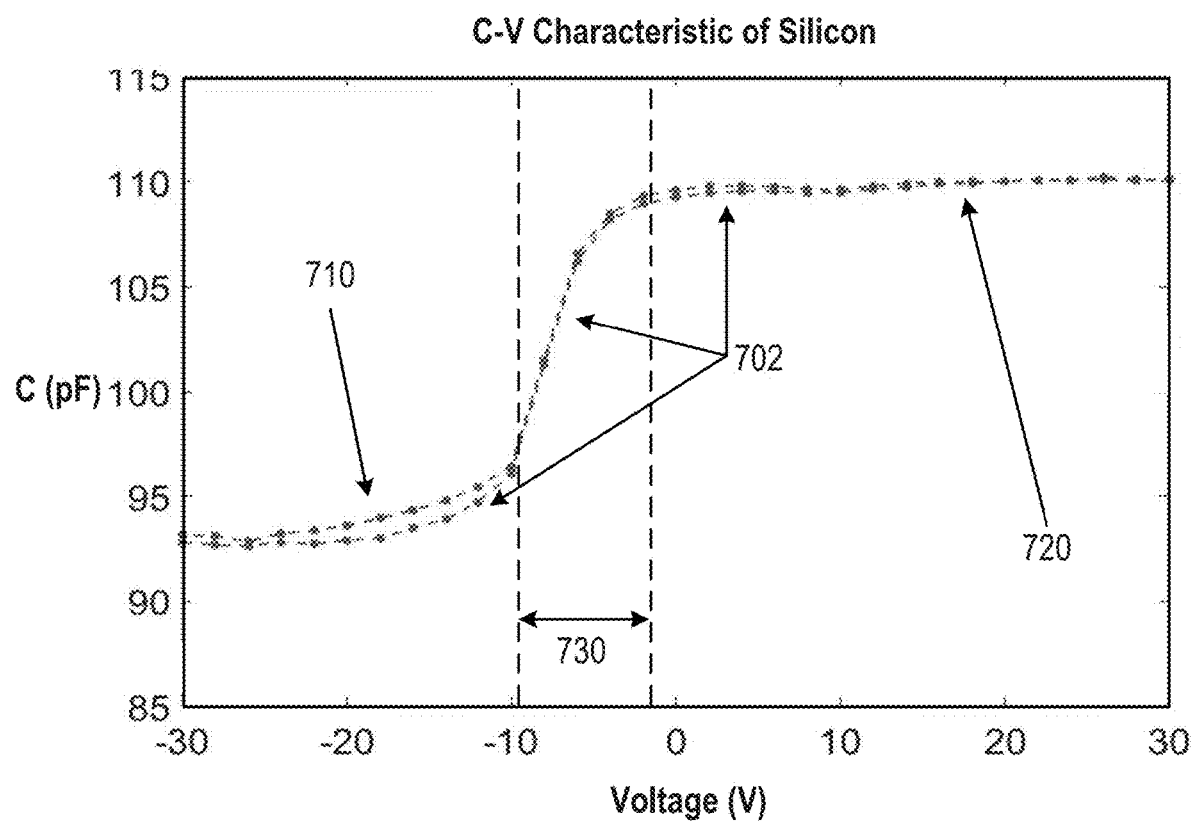
FIG. 7 illustrate an exemplary C-V characteristic of silicon, according to embodiments of the disclosure.

However, the capacitance value directly measured by capacitance sensor 390 disposed between mirror 310 and anchor 340 is not the same as $C_f$. The presence of the parasitic capacitance of substrate 302 makes accurate capacitance sensing challenging. As shown in FIG. 6, the capacitance value directly measured by capacitance sensor 390 is the total capacitance $C_T$, which is the sum of the capacitance between the two sets of comb fingers ($C_f$) and the parasitic capacitance of substrate 302 ($C_s$) because $C_f$ is in parallel to $C_s$. $C_s$ varies when the driving voltage is applied (e.g., by driving voltage source 380) due to the transition from charge depletion to charge accumulation, or vice versa. FIG. 7 shows an exemplary capacitance-voltage (C-V) characteristic of silicon, the material of semiconductor layer 304. As shown in FIG. 7, a capacitance curve 702 indicates that the parasitic capacitance changes from about 93 pF to about 110 pF when the applied voltage changes from −30 V to 30 V. To drive mirror 310 to tilt back and forth, the driving voltage provided by driving voltage source 380 is typically an alternate current (AC) voltage, which changes from a negative peak to a positive peak. Therefore, when such an AC driving voltage is applied, $C_s$ constantly varies, making it difficult to accurately determine $C_f$ from the measured total capacitance $C_T$.

Embodiments of the present disclosure address this problem by applying a bias voltage to substrate 302. Referring to FIGS. 3-5, mirror assembly 300 may include a bias voltage source 370 electrically coupled to substrate 302 to bias substrate 302 with a bias voltage. In some embodiments, bias voltage source 370 may be electrically coupled to semiconductor layer 304 to bias semiconductor layer 304, as shown in FIGS. 4 and 5. Biasing substrate 302 may force substrate 302 (or its semiconductor layer 304) to operate in either an accumulation mode or a depletion mode. Referring to FIG. 7, capacitance curve 702 in general has three regions corresponding to three operation modes. When voltage is lower than about −10 V, capacitance curve 702 enters depletion region 710. When voltage is higher than about −3 V, capacitance curve 702 enters accumulation region 720. Between depletion region 710 and accumulation region 720 is a transition region 730, in which the parasitic capacitance changes abruptly. On the other hand, in either depletion region 710 or accumulation region 720, the parasitic capacitance is clamped to a relatively stable value.

The accuracy of capacitance sensing can be improved when substrate 302 operates in either the depletion mode or the accumulation mode during the application of the driving voltage. To that end, the bias voltage can be a direct current (DC) voltage, the absolute value of which can be set higher than the peak-to-peak value of the driving voltage (or the peak-to-peak value plus any DC offset contained in the driving voltage, hereinafter collectively referred to as the peak-to-peak value of the driving voltage) such that substrate 302 would operate in the depletion mode even when the driving voltage reaches its positive peak, or that substrate 302 would operate in the accumulation mode even when the driving voltage reaches its negative peak. In other words, the voltage offset of substrate 302 created by the bias voltage can be greater than the peak-to-peak value of the driving voltage. In this way, the substrate parasitic capacitance $C_s$ can be kept relatively constant, leading to more accurate $C_f$.

For example, when the driving voltage is an AC voltage having a peak-to-peak value of 110 V, the bias voltage can be a negative DC voltage lower than −120 V (e.g., offsetting substrate 302 by a negative offset of more than 120 V), such that when the driving voltage reaches its positive peak (e.g., +110 V relative to the negative offset), the total voltage applied to substrate 302 is still lower than −10 V, within the depletion region shown in FIG. 7. Alternatively, the bias voltage can be a positive DC voltage higher than 110 V (e.g., offsetting substrate 302 by a positive offset of more than 110

V), such that when the driving voltage reaches its negative peak (e.g., −110 V relative to the positive offset), the total voltage applied to substrate 302 is still higher than 0 V, within the accumulation region shown in FIG. 7. It is noted that the value of the bias voltage depends on the driving voltage as well as the C-V characteristic of the substrate, and can be adjusted accordingly.

Referring to FIGS. 3-5, mirror assembly 300 may include a voltage regulator 360 electrically coupled to bias voltage source 370 to regulate the bias voltage based on the driving voltage. For example, voltage regulator 360 may include a feedback network to sense the driving voltage of driving voltage source 380, and change the bias voltage accordingly.

Figure 8:
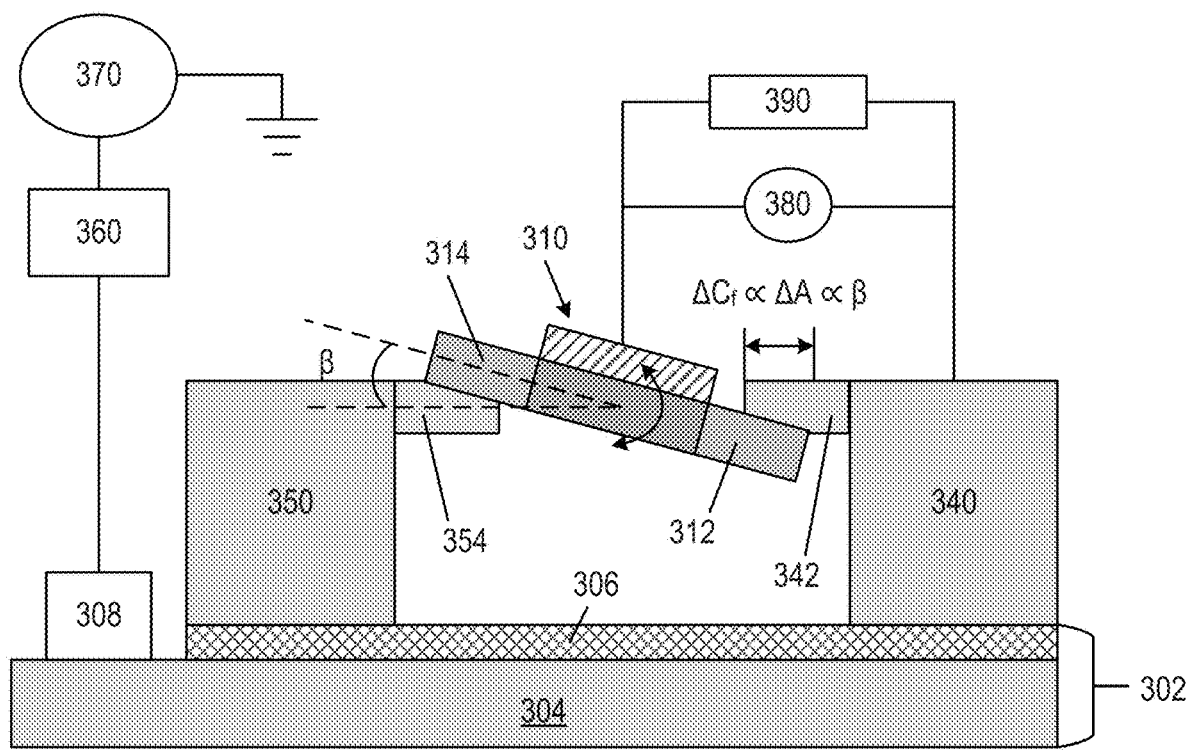
FIG. 8 illustrates another exemplary mirror assembly, according to embodiments of the disclosure.

FIG. 8 illustrates another exemplary mirror assembly in which bias voltage source 370 can be electrically coupled to semiconductor layer 304 from a different side than the example shown in FIG. 5. While other components or configurations of the mirror assembly shown in FIG. 8 can be the same as or similar to those shown in FIG. 5, bias voltage source 370 can be electrically coupled to semiconductor layer 304 from the top side of substrate 302 instead of from the bottom side. As used herein, the top side of substrate 302 refers to the side on which mirror 310 is suspended, and the bottom side of substrate 302 refers to the opposite side to the top side. As shown in FIG. 8, bias voltage source 370 may be electrically coupled to semiconductor layer 302 via a conductor layer 308 (e.g., a metal pad, an electrode, etc.) that is formed on the top side of semiconductor layer 304. While FIG. 8 shows that conductor layer 308 is separate from insulator layer 306, in some embodiments, conductor layer 308 may be surrounded by insulator layer 306. For example, conductor layer 308 may form a conductive path through insulator layer 306 to reach semiconductor layer 304. Coupling bias voltage source 370 from the top side of substrate 302 may be compatible with the fabrication process flow, in which conductor layer 308 may be formed as part of the fabrication process and bias voltage source 370 may be formed along with other components on top of substrate 302.

Similar to FIGS. 3-5, voltage regulator 360 may be electrically coupled to bias voltage source 370 to regulate the bias voltage based on the driving voltage. As shown in FIG. 8, voltage regulator 360 may be coupled to bias voltage source 370 from the top side of substrate 302. For example, bias voltage source 370 may be electrically coupled to voltage regulator 360, which in turn may be electrically coupled to conductor layer 308 such that both bias voltage source 370 and voltage regulator 360 are electrically coupled to semiconductor layer 304.

Figure 9:
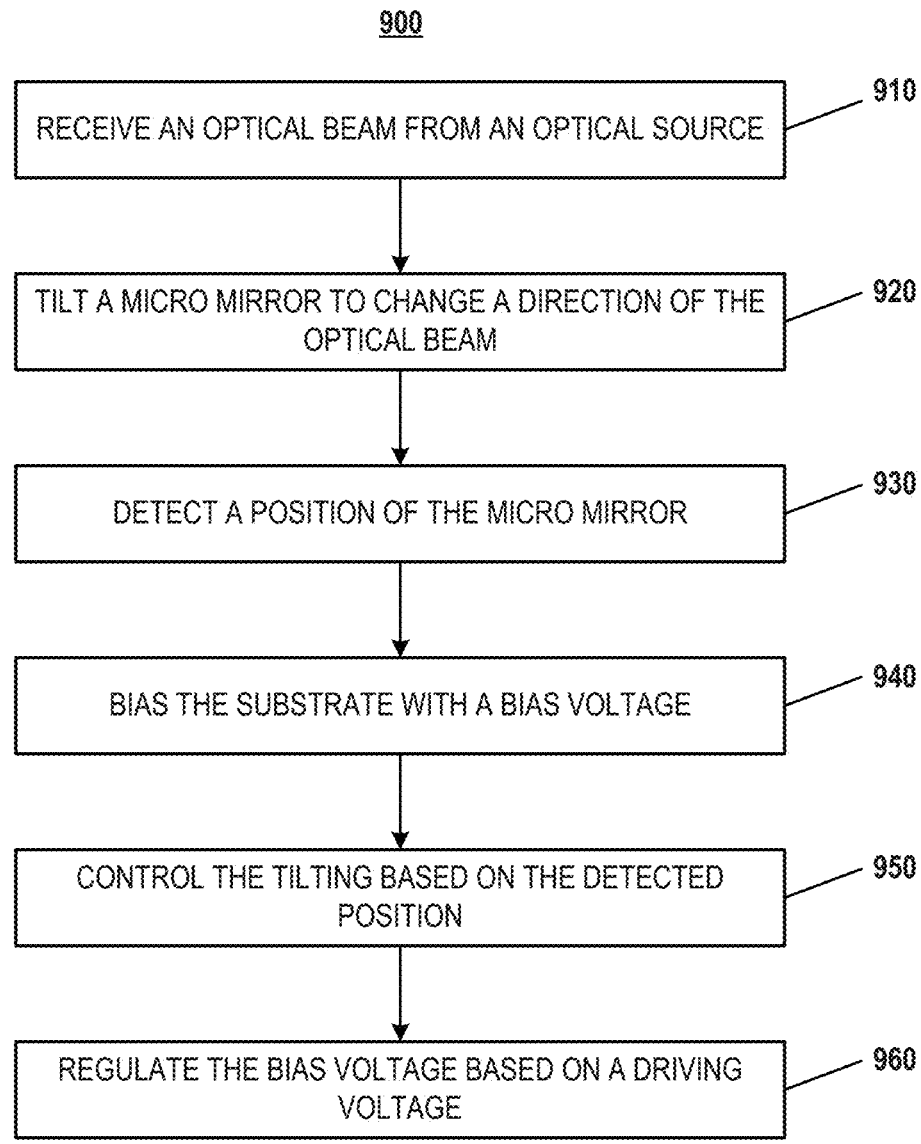
FIG. 9 illustrates a flow chart of an exemplary method for controlling a mirror assembly, according to embodiments of the disclosure.

FIG. 9 illustrates a flow chart of an exemplary method 900 for controlling a mirror assembly (e.g., mirror assembly 300) in an optical sensing system (e.g., LiDAR system 102), according to embodiments of the disclosure. Method 900 may include multiple steps. It is to be appreciated that some of the steps may be omitted to perform method 900. Further, some of the steps may be performed simultaneously, or in a different order than shown in FIG. 9.

In step 910, a micro mirror (e.g., mirror 310) may receive an optical beam (e.g., laser beam 207) emitted from an optical source (e.g., optical source 206). For example, optical source 206 may be controlled by processor 220 to emit laser beam 207 (e.g., a pulsed laser beam), which may travel toward mirror 310 of mirror assembly 300, which may be part of scanner 210. Mirror 310 may receive laser beam 207 and change the direction of laser beam 207 to scan an environment around optical sensing system 102.

In step 920, an actuator (e.g., the actuator that includes anchor 340, comb fingers 342, comb fingers 312, and driving voltage source 380) may tilt mirror 310 with respect to substrate 302 to change the direction of laser beam 207 (e.g., becoming laser beam 209) to scan the environment. For example, driving voltage source 380 may apply a driving voltage across the interleaving comb fingers 312 and 342 to attract comb fingers 312 toward comb fingers 342, thereby tilting mirror 310 along an axis (e.g., the axis defined by beams 322 and 332). The driving voltage may be an AC voltage with alternating polarities (e.g., changing between positive and negative voltages). The frequency of the AC voltage may be set to be or close to the resonant frequency of mirror 310 to achieve the maximum tilting range.

In step 930, a position sensor (e.g., position sensor 390) may detect a position of mirror 310 (e.g., tilting angle (3). For example, position sensing may be implemented by capacitance sensing, in which position sensor 390 may measure the capacitance or a change in capacitance between mirror 310 and anchor 340. As discussed above, the capacitance measured by position sensor 390 is the total capacitance ($C_T$) including the capacitance between comb fingers 312 and 342 ($C_f$) and the parasitic capacitance of substrate 302 ($C_s$). With the applicant of the AC driving voltage, the parasitic capacitance $C_s$ varies, as shown in FIG. 7. To maintain a relative constant parasitic capacitance $C_s$, in step 940, a bias voltage is applied to substrate 302 by a bias voltage source (e.g., bias voltage source 370) to force substrate 302 to operate in either an accumulation mode or a depletion mode. The bias voltage (e.g., the absolute value thereof) can be set to be higher than the peak-to-peak value of the AC driving voltage such that substrate 302 would maintain its operation mode (e.g., accumulation or depletion) even under the peaks of the AC driving voltage. In this way, the parasitic capacitance can be clamped to a relatively stable range, improving the accuracy of capacitance sensing. In some embodiments, when substrate 302 has multiple layers, bias voltage source 370 may be electrically coupled to a semiconductor layer (e.g., semiconductor layer 304) to apply the bias voltage to the semiconductor layer.

In step 950, the actuator may control the tilting of mirror 310 based on the detected position. For example, a closed-loop control may be used to control the timing of the application of the driving voltage based on the position of mirror 310 fed back from position sensor 390.

In step 960, a voltage regulator (e.g., voltage regulator 360) electrically coupled to bias voltage source 370 may regulate the bias voltage based on the driving voltage. For example, voltage regulator 360 may include passive components (e.g., resistors, capacitors, etc.) and/or active components (e.g., amplifier, sensors, transistors, etc.) to dynamically adjust the bias voltage such that the driving voltage would not change the operation mode of substrate 302 during the operation of mirror assembly 300.

It is noted that step 940 may be performed before step 910, 920, or 930, or be performed in parallel or simultaneously with any of the other steps in method 900.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A mirror assembly for controlling optical directions in an optical sensing system, the mirror assembly comprising:
a substrate;
a micro mirror suspended over the substrate by at least one beam, wherein the at least one beam is mechanically coupled to the substrate;
an actuator configured to tilt the micro mirror with respect to the substrate;
a position sensor configured to detect a position of the micro mirror; and
a bias voltage source electrically coupled to the substrate to bias the substrate with a bias voltage,
wherein the bias voltage source is configured to apply the bias voltage to the substrate such that the substrate operates in an accumulation mode.

2. The mirror assembly of claim 1, wherein the substrate comprises:
a semiconductor layer comprising silicon (Si); and
an insulator layer comprising silicon dioxide ($SiO_2$).

3. The mirror assembly of claim 2, wherein the bias voltage source is electrically coupled to the semiconductor layer of the substrate to bias the semiconductor layer with the bias voltage.

4. The mirror assembly of claim 3, wherein the bias voltage source is configured to apply the bias voltage to the semiconductor layer of the substrate such that the semiconductor layer of the substrate operates in the accumulation mode.

5. The mirror assembly of claim 1, wherein the bias voltage source is electrically coupled to the substrate from a top side of the substrate.

6. A mirror assembly for controlling optical directions in an optical sensing system, the mirror assembly comprising:
a substrate;
a micro mirror suspended over the substrate by at least one beam, wherein the at least one beam is mechanically coupled to the substrate;
an actuator configured to tilt the micro mirror with respect to the substrate;
a position sensor configured to detect a position of the micro mirror; and
a bias voltage source electrically coupled to the substrate to bias the substrate with a bias voltage,
wherein the actuator comprises:
an anchor mechanically coupled to the substrate;
a first plurality of comb fingers extending from the anchor toward the micro mirror;
a second plurality of comb fingers extending from the micro mirror toward the anchor and interleaving with the first plurality of comb fingers; and
a driving voltage source configured to apply a driving voltage across the first plurality of comb fingers and the second plurality of comb fingers to tilt the micro mirror.

7. The mirror assembly of claim 6, wherein:
the driving voltage comprises an alternate current (AC) voltage having a peak-to-peak value; and
the bias voltage comprises a direct current (DC) voltage offsetting the substrate by an offset that is greater than the peak-to-peak value.

8. The mirror assembly of claim 6, wherein the position sensor comprises a capacitance sensor configured to measure capacitance or a change in capacitance between the micro mirror and the anchor.

9. A method for controlling a mirror assembly in an optical sensing system, the method comprising:
receiving, by a micro mirror of the mirror assembly, an optical beam emitted from an optical source, wherein the micro mirror is suspended over a substrate of the mirror assembly by at least one beam mechanically coupled to the substrate;
tilting, by an actuator, the micro mirror with respect to the substrate to change a direction of the optical beam;
detecting, by a position sensor, a position of the micro mirror;
controlling, by the actuator, the tilting of the micro mirror based on the detected position; and
biasing, by a bias voltage source electrically coupled to the substrate, the substrate with a bias voltage such that the substrate operates in an accumulation mode.

10. The method of claim 9, wherein the substrate comprises:
a semiconductor layer comprising silicon (Si); and
an insulator layer comprising silicon dioxide ($SiO_2$).

11. The method of claim 10, wherein biasing the substrate comprises:
applying, by the bias voltage source, the bias voltage to the semiconductor layer of the substrate such that the semiconductor layer of the substrate operates in the accumulation mode.

12. A method for controlling a mirror assembly in an optical sensing system, the method comprising:
receiving, by a micro mirror of the mirror assembly, an optical beam emitted from an optical source, wherein the micro mirror is suspended over a substrate of the mirror assembly by at least one beam mechanically coupled to the substrate;
tilting, by an actuator, the micro mirror with respect to the substrate to change a direction of the optical beam;
detecting, by a position sensor, a position of the micro mirror;
controlling, by the actuator, the tilting of the micro mirror based on the detected position; and
biasing, by a bias voltage source electrically coupled to the substrate, the substrate with a bias voltage,
wherein tilting the micro mirror comprises:
applying, by a driving voltage source, a driving voltage across a first plurality of comb fingers and a second plurality of comb fingers, wherein:
the first plurality of comb fingers extend from an anchor toward the micro mirror, the anchor being mechanically coupled to the substrate; and
the second plurality of comb fingers extend from the micro mirror toward the anchor and interleave with the first plurality of comb fingers.

13. The method of claim 12, wherein:
the driving voltage comprises an alternate current (AC) voltage having a peak-to-peak value; and
the bias voltage comprises a direct current (DC) voltage offsetting the substrate by an offset that is greater than the peak-to-peak value.

14. The method of claim 12, wherein detecting the movement of the micro mirror comprises:
measuring, by a capacitance sensor, capacitance or a change in capacitance between the micro mirror and the anchor.

15. The method of claim 12, further comprising:
regulating, by a voltage regulator electrically coupled to the bias voltage source, the bias voltage based on the driving voltage.

16. An optical sensing system, comprising:
an optical source configured to emit an optical beam to scan an environment around the optical sensing system; and
a mirror assembly configured to control a direction of the optical beam, the mirror assembly comprising:
  a substrate;
  a micro mirror suspended over the substrate by at least one beam, wherein the at least one beam is mechanically coupled to the substrate;
  an actuator configured to tilt the micro mirror with respect to the substrate;
  a position sensor configured to detect a position of the micro mirror; and
  a bias voltage source electrically coupled to the substrate to bias the substrate with a bias voltage,
  wherein the bias voltage source is configured to apply the bias voltage to the substrate such that the substrate operates in an accumulation mode.

17. The mirror assembly of claim 16, wherein the bias voltage source is electrically coupled to the substrate from a top side of the substrate.

18. An optical sensing system, comprising:
an optical source configured to emit an optical beam to scan an environment around the optical sensing system; and
a mirror assembly configured to control a direction of the optical beam, the mirror assembly comprising:
  a substrate;
  a micro mirror suspended over the substrate by at least one beam, wherein the at least one beam is mechanically coupled to the substrate;
  an actuator configured to tilt the micro mirror with respect to the substrate;
  a position sensor configured to detect a position of the micro mirror; and
  a bias voltage source electrically coupled to the substrate to bias the substrate with a bias voltage,
  wherein the actuator comprises:
    an anchor mechanically coupled to the substrate;
    a first plurality of comb fingers extending from the anchor toward the micro mirror;
    a second plurality of comb fingers extending from the micro mirror toward the anchor and interleaving with the first plurality of comb fingers; and
    a driving voltage source configured to apply a driving voltage across the first plurality of comb fingers and the second plurality of comb fingers to tilt the micro mirror.

19. The optical sensing system of claim 18, wherein:
the driving voltage comprises an alternate current (AC) voltage having a peak-to-peak value; and
the bias voltage comprises a direct current (DC) voltage offsetting the substrate by an offset that is greater than the peak-to-peak value.

20. The mirror assembly of claim 18, wherein the position sensor comprises a capacitance sensor configured to measure capacitance or a change in capacitance between the micro mirror and the anchor.

* * * * *